United States Patent
Kohno

(10) Patent No.: US 12,313,335 B2
(45) Date of Patent: May 27, 2025

(54) COOLING AND WARMING SYSTEM

(71) Applicant: Yazaki Corporation, Tokyo (JP)

(72) Inventor: Yasushi Kohno, Susono (JP)

(73) Assignee: Yazaki Corporation, Tokyo (JP)

( * ) Notice: Subject to any disclaimer, the term of this patent is extended or adjusted under 35 U.S.C. 154(b) by 424 days.

(21) Appl. No.: 18/058,028

(22) Filed: Nov. 22, 2022

(65) Prior Publication Data

US 2023/0085427 A1    Mar. 16, 2023

Related U.S. Application Data

(63) Continuation of application No. PCT/JP2021/021881, filed on Jun. 9, 2021.

(30) Foreign Application Priority Data

Jun. 26, 2020  (JP) ................... 2020-110648

(51) Int. Cl.
  *F25D 31/00* (2006.01)
  *F25D 29/00* (2006.01)
  *G05B 19/4155* (2006.01)
  *G06K 7/10* (2006.01)

(52) U.S. Cl.
  CPC ......... *F25D 31/005* (2013.01); *F25D 29/003* (2013.01); *G05B 19/4155* (2013.01); *G06K 7/10366* (2013.01); *G05B 2219/50333* (2013.01)

(58) Field of Classification Search
  CPC .. G05B 19/4155; F25D 29/003; F25D 31/005
  See application file for complete search history.

(56) References Cited

U.S. PATENT DOCUMENTS

| 10,731,919 | B1 * | 8/2020 | Gutierrez | F25D 27/005 |
| 2019/0372449 | A1 | 12/2019 | Mills | |
| 2020/0366180 | A1 | 11/2020 | Mills | |
| 2021/0311494 | A1 * | 10/2021 | Qiu | B60P 3/20 |

FOREIGN PATENT DOCUMENTS

| CN | 102542833 A | 7/2012 | |
| CN | 110494388 A | 11/2019 | |
| EP | 3531354 A1 * | 8/2019 | ......... B60H 1/00264 |
| JP | 2003-237457 A | 8/2003 | |
| JP | 2004-070911 A | 3/2004 | |
| JP | 2004-251508 A | 9/2004 | |

(Continued)

OTHER PUBLICATIONS

Jul. 27, 2021—International Search Report—Intl App PCT/JP2021/021881.

*Primary Examiner* — Mong-Shune Chung
(74) *Attorney, Agent, or Firm* — Banner & Witcoff, Ltd.

(57) ABSTRACT

A sensor-equipped RF tag is attached to a cooling box accommodating a cooling agent, and detects a temperature inside the cooling box, and a temperature and a position of the cooling agent. The sensor-equipped RF tag sends the detected temperature inside the cooling box, and the temperature and the position of the cooling agent to a server directly or via a taximeter. The server orders the cooling agent from a center terminal installed in a freezing center around a position of a taxi vehicle based on a detection result of the sensor-equipped RF tag.

12 Claims, 11 Drawing Sheets

(56) References Cited

FOREIGN PATENT DOCUMENTS

| | | | |
|---|---|---|---|
| JP | 2010-073102 A | 4/2010 | |
| JP | 2012-032087 A | 2/2012 | |
| JP | 2018055401 A * | 4/2018 | |
| JP | 2019053526 A * | 4/2019 | |
| WO | WO-2018075157 A1 * | 4/2018 | ......... B65D 81/3813 |
| WO | 2018-155408 A1 | 8/2018 | |

* cited by examiner

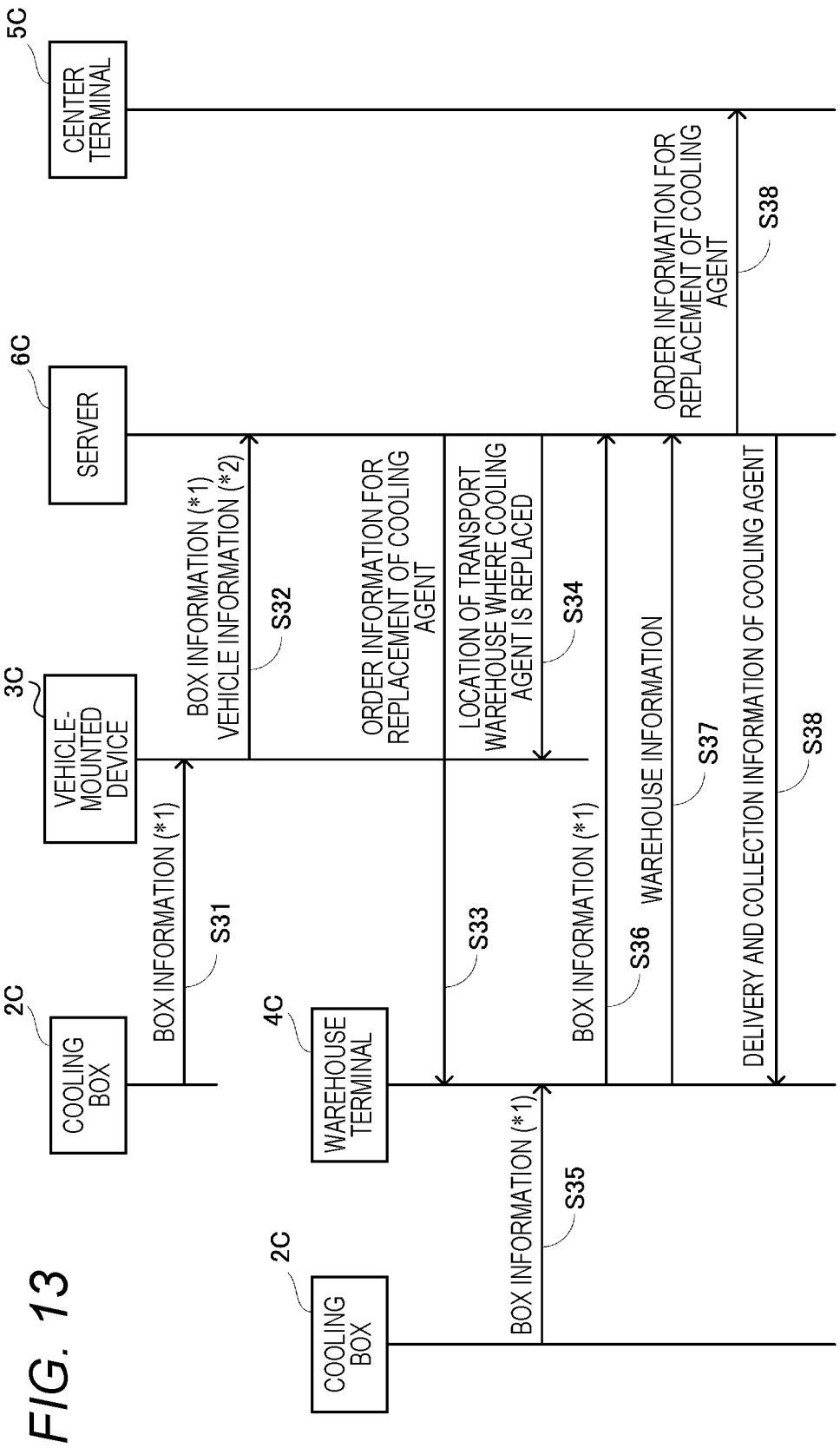

COOLING AND WARMING SYSTEM

CROSS REFERENCE TO RELATED APPLICATIONS

This application is a continuation of PCT application No. PCT/JP2021/021881, which was filed on Jun. 9, 2021 based on Japanese patent application 2020-110648 filed on Jun. 26, 2020, whose contents are incorporated herein by reference. Also, all the references cited herein are incorporated as a whole.

BACKGROUND OF THE INVENTION

Technical Field

The present invention relates to a cooling and warming system.

Background Art

In the related art, a cooling box is used for storing foods and the like (Patent Literature 1). A cooling agent is accommodated in the cooling box.

CITATION LIST

Patent Literature

Patent Literature 1: JP-A-2012-032087

SUMMARY

However, in the related art, there is no proposal for a technique for managing the cooling box.

The present invention is made in view of the above circumstances, and an object of the present invention is to provide a cooling and warming system capable of managing a cooling and warming box.

Solution to Problem

A cooling and warming system according to an embodiment includes a first sensor that is attached to a cooling and warming box accommodating a cooling and warming agent and that detects a temperature inside the cooling and warming box and a temperature of the cooling and warming agent, and an ordering unit that performs ordering of the cooling and warming agent based on a detection result of the first sensor.

BRIEF DESCRIPTION OF THE DRAWINGS

FIG. 13 is a sequence diagram showing operation of the cooling system shown in FIG. 11.

DETAILED DESCRIPTION OF EMBODIMENTS

First Embodiment

Specific embodiments related to the present invention will be described below with reference to the drawings.

A cooling system 1A in the first embodiment is a system in which a cooling box 2A (cooling and warming box) is mounted on a taxi vehicle 7A (vehicle), which is an example of a commercial vehicle, so that a usage fee can be added to a fare for a passenger using the cooling box 2A. The cooling system 1A in the first embodiment is also a system capable of ordering and instructing replacement of the cooling agent accommodated in the cooling box 2A.

The cooling system 1A of the present embodiment includes the cooling box 2A and a taximeter 3A mounted on the taxi vehicle 7A, a center terminal 4A installed in a freezing center 8A (depository), and a server 5A (ordering unit, calculation unit) capable of communicating with the taximeter 3A and the center terminal 4A via the Internet communication network 6A.

Examples of the cooling box 2A include a cooling box for refrigeration and a cooling box for freezing. The cooling box 2A for refrigeration is a box capable of setting a temperature inside the box to 0° C. to 10° C. (refrigeration temperature range) without a power source by using a cooling agent such as dry ice or a cooling gel. The cooling box 2A for freezing is a box capable of setting the temperature inside the box to −15° C. or lower (freezing temperature range) without a power source by using a cooling agent such as dry ice or a cooling gel.

Each cooling box 2A is attached with an sensor-equipped RF tag 21 (first sensor, second sensor). The sensor-equipped RF tag 21 includes a built-in sensor that detects the temperature inside the box, a temperature of the cooling agent, humidity, position, vibration, and an atmosphere composition inside the box, and a built-in memory, and periodically records information of the sensor in the memory. The temperature range (freezing or refrigeration) is recorded in advance in the memory. The sensor-equipped RF tag 21 can read the information recorded in the memory in a non-contact manner by wirelessly communicating with an RF reader and writer 12A connected to the taximeter 3A. For example, the RF reader and writer 12A reads the temperature range (freezing or refrigeration), temperature inside the box, temperature of the cooling agent, humidity, position, vibration, and atmosphere composition inside the box periodically recorded in the memory of the sensor-equipped RF tag 21 as box information and outputs the box information to the taximeter 3A.

Figure 1:
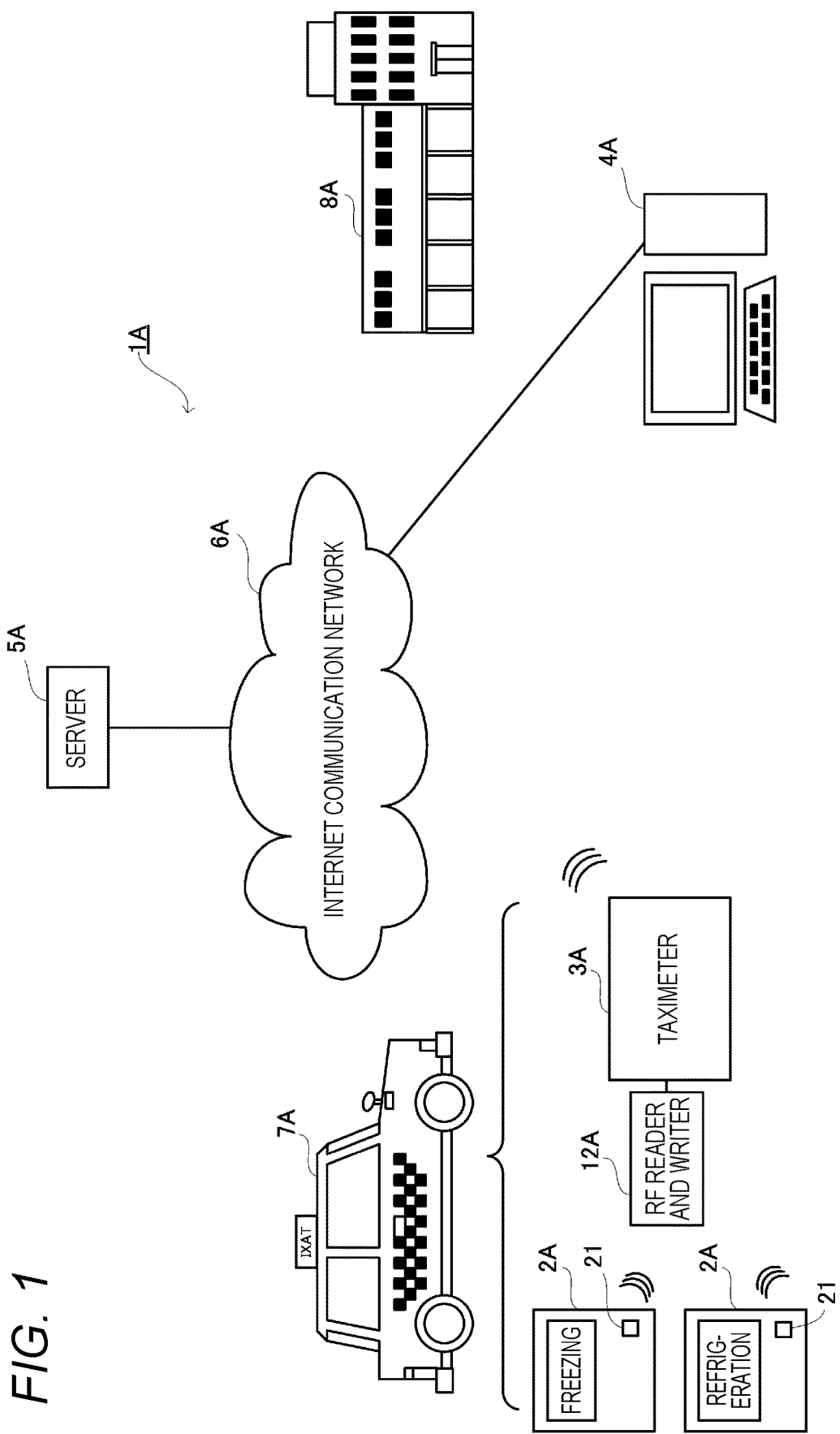
FIG. 1 is a configuration diagram of a cooling system as a cooling and warming system of the present invention in a first embodiment.
Figure 2:
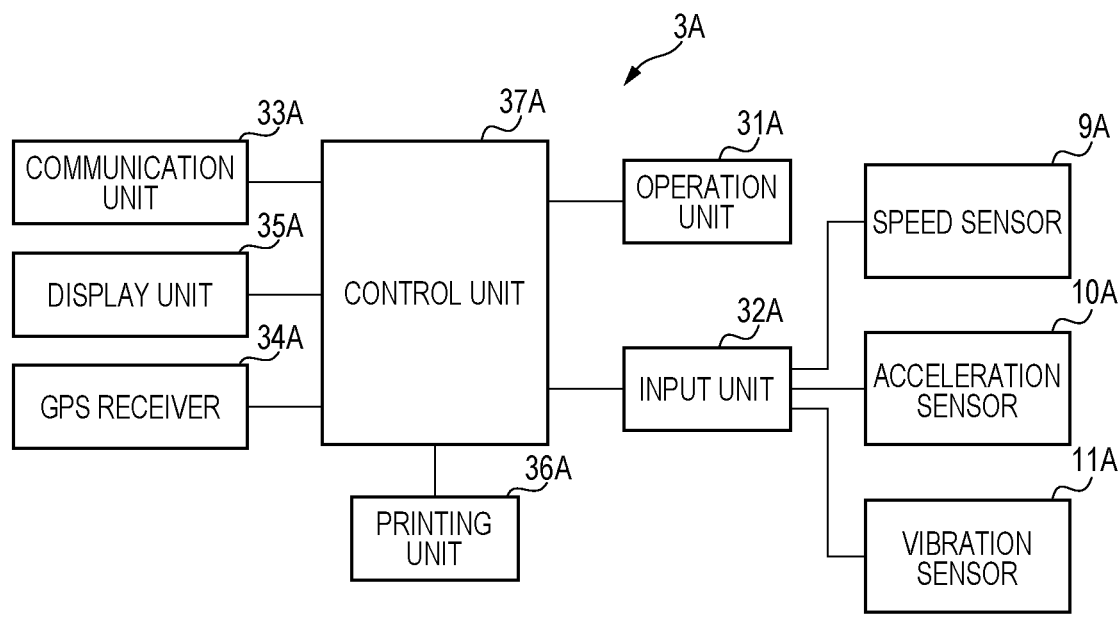
FIG. 2 is a configuration diagram of a taximeter shown in FIG. 1.

The taximeter 3A is owned by a taxi company. The taximeter 3A is mounted on the taxi vehicle 7A and calculates the fare. The taximeter 3A sends the box information recorded in the memory of the sensor-equipped RF tag 21 read by the RF reader and writer 12A to the server 5A. As shown in FIG. 2, the taximeter 3A includes an operation unit 31A, an input unit 32A, a communication unit 33A, a GPS receiver 34A (second sensor), a display unit 35A, a printing unit 36A, and a control unit 37A.

The operation unit 31A includes various buttons 311A (see FIG. 3) such as a vacant button, an occupied button, and a payment button. The operation unit 31A is an operation unit for allowing a taxi driver to input a state of the taxi vehicle 7A (whether the taxi vehicle 7A is vacant or occupied, or the taxi vehicle 7A arrives at a destination and payment is made). In the present embodiment, the operation unit 31A includes a freezing button 312A indicating use of the cooling box for freezing, and a refrigeration button 313A indicating use of the cooling box for refrigeration.

Figure 3:
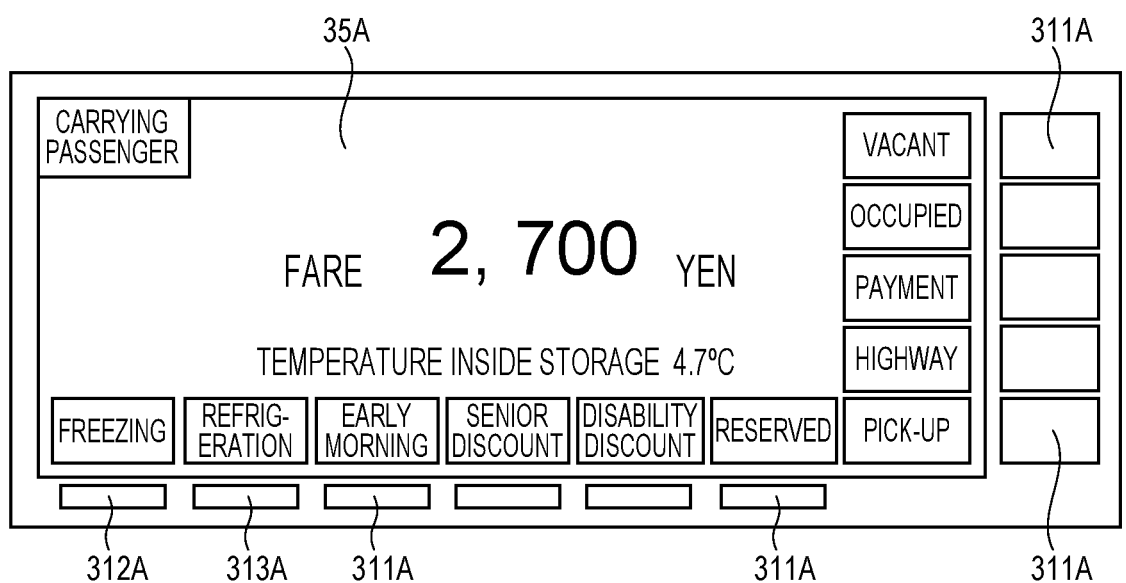
FIG. 3 is an external view of the taximeter shown in FIG. 1.

The input unit 32A is connected to a speed sensor 9A, an acceleration sensor 10A, and a vibration sensor 11A, and a speed, an acceleration, and vibration detected by the speed sensor 9A, the acceleration sensor 10A, and the vibration sensor 11. A are input to the input unit 32A. The communication unit 33A includes a circuit, an antenna, or the like for connecting to the Internet communication network 6A. As is well known, the GPS receiver 34A receives radio waves oscillated from a plurality of global positioning system (GPS) satellites, acquires a current position, and outputs the current position to the control unit 37A described later. As shown in FIG. 3, the display unit 35A displays the above fare and the temperature inside the storage of the cooling box 2A used by the passenger. When a printing button (not shown) is pressed, the printing unit 36A prints and outputs a receipt indicating the fare.

The control unit 37A includes a central processing unit (CPU) provided with a memory such as a random access memory (RAM) or a read only memory (ROM), and controls the entire taximeter 3A. The control unit 37A calculates the fare when the occupied button, which is one of the buttons 311A, is pressed. When the freezing button 312A or the refrigeration button 313A is pressed, the control unit 37A adds the usage fee of the cooling box 2A for freezing or refrigeration to the fare. On the receipt printed by the printing unit 36A, an average temperature in the used cooling box 2A is described. The control unit 37A displays the temperature inside the cooling box 2A for freezing or refrigeration read by the RF reader and writer 12A on the display unit 35A when the freezing button 312A or the refrigeration button 313A is pressed. The control unit 37A controls the communication unit 33A to periodically send the box information read from the sensor-equipped RF tag 21 by the RF reader and writer 12A and vehicle information to the server 5A. The vehicle information is information acquired by the taximeter 3A, and includes, for example, the position acquired from the GPS receiver 34A, and the speed, acceleration, and vibration acquired from the speed sensor 9A, acceleration sensor 10A, and vibration sensor 11A.

The center terminal 4A is a terminal installed in the freezing center 8A and includes a PC. The freezing center 8A includes a large-scale freezing facility for freezing the cooling agent, and deposits the frozen cooling agent. The freezing center 8A collects the used (unfrozen) cooling agent collected from the taxi vehicle 7A, freezes the cooling agent again by the freezing facility, and deposits the frozen cooling agent. The center terminal 4A communicates with the server 5A, which will be described later, to receive an order for replacement of the cooling agent.

Figure 4:
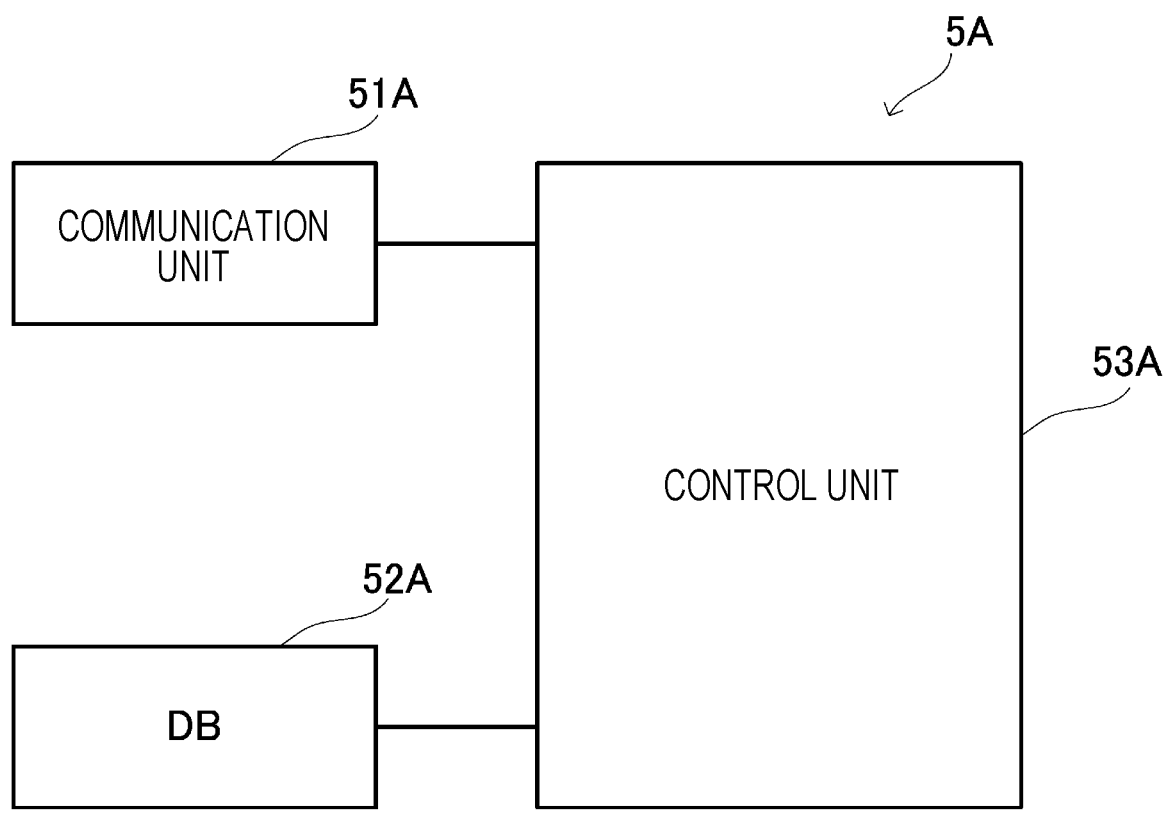
FIG. 4 is a configuration diagram of a server shown in FIG. 1.

The server 5A is owned by an operating company that operates the cooling system 1A. As shown in FIG. 4, the server 5A includes a communication unit 51A, a database (DB) 52A, and a control unit 53A.

The communication unit 51A includes a circuit or the like for connecting to the Internet communication network 6A. The DB 52A stores a position of the freezing center 8A, and the box information and the vehicle information sent from the taximeter 3A. The control unit 53A includes a CPU provided with a memory such as an RAM or an ROM, and controls the entire server 5A. The control unit 53A performs ordering for replacement of the cooling agent based on the temperature inside the cooling box 2A and the temperature of the cooling agent among the box information received from the taximeter 3A.

Figure 5:
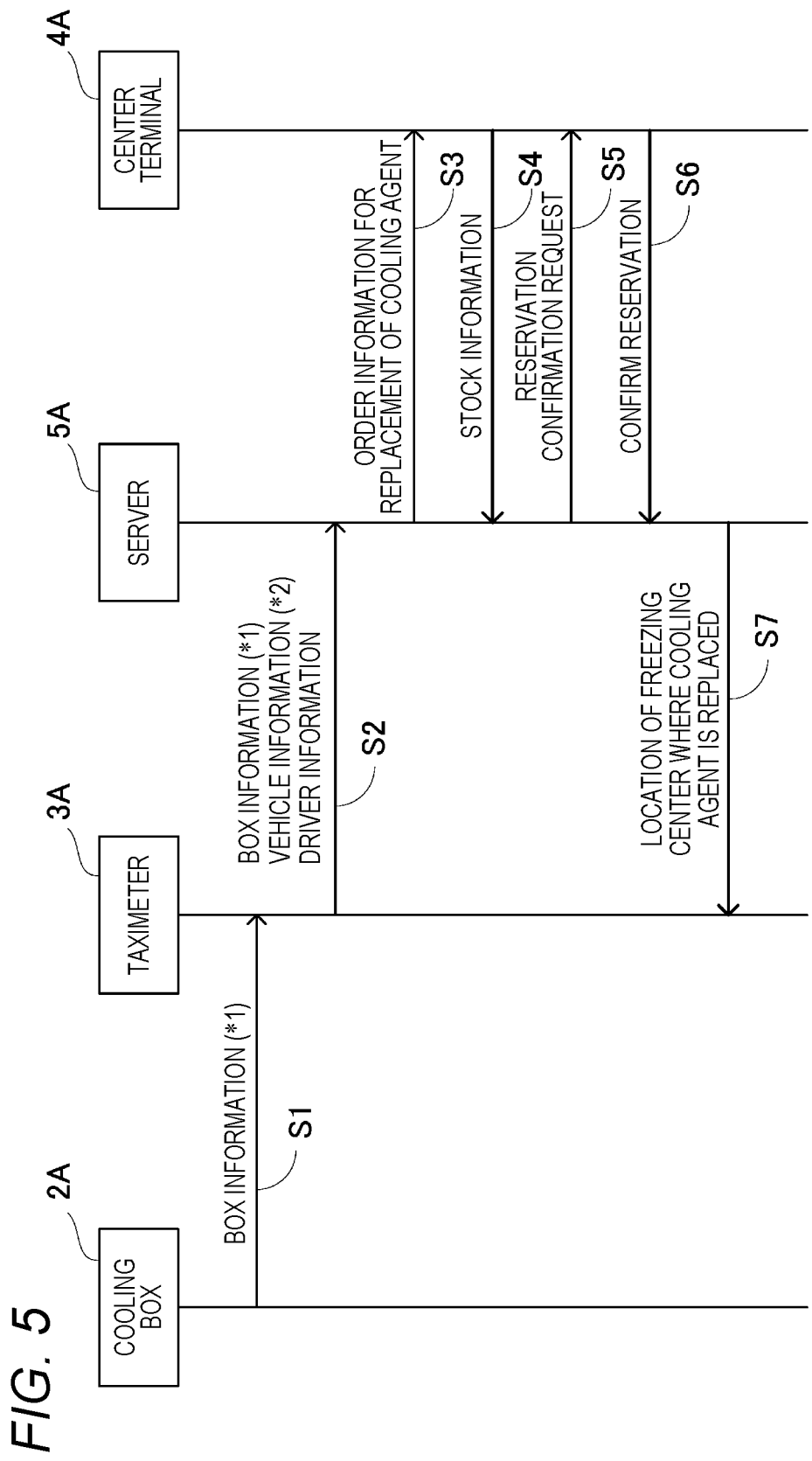
FIG. 5 is a sequence diagram showing operation of the cooling system shown in FIG. 1.

Next, operation of the cooling system 1A having the above configuration will be described with reference to FIG. 5. The box information is periodically sent from the sensor-equipped RF tag 21 provided in the cooling box 2A to the taximeter 3A (S1). The taximeter 3A periodically adds driver information indicating information of a driver to the box information and the vehicle information and then sends to the server 5A (S2). The server 5A calculates a maintenance time during which the temperature inside the cooling box 2A is maintained within the freezing temperature range or the refrigeration temperature range from the temperature inside the box and the temperature of the cooling agent included in the box information. When the maintenance time is within a predetermined value, the server 5A searches the freezing center 8A around the current position of the taxi vehicle 7A based on the position information included in the box information and the vehicle information. The server 5A sends order information for the replacement of the cooling agent to the center terminal 4A installed in the searched freezing center 8A (S3). The server 5A includes the driver information of the driver who performs the replacement to the order information.

When receiving the order information for the replacement of the cooling agent, the center terminal 4A confirms stock and sends a state of the stock to the server 5A (S4). In a case of in stock, the server 5A sends a reservation confirmation request to the center terminal 4A (S5). When receiving the reservation confirmation request, the center terminal 4A confirms a reservation and sends that the reservation is confirmed to the server 5A (56). When receiving the confirmed reservation, the server 5A sends a location of the freezing center 8A where the ordering for the replacement of the cooling agent is performed with respect to the taximeter 3A (S7).

In addition to the communication with the server 5A, the taximeter 3A adds the usage fee of the cooling box 2A to the fare when the freezing button 312A or the refrigeration button 313A is pressed. When the printing button (not shown) is pressed, the taximeter 3A prints the receipt indicating the fare including the usage fee of the cooling agent, and also prints the average temperature inside the cooling box 2A.

According to the above embodiment, the sensor-equipped RF tag 21 detects the temperature inside the cooling box 2A and the temperature of the cooling agent. The server 5A performs the ordering for the cooling agent based on the detection result of the sensor-equipped RF tag 21. As a result, it is possible to perform the ordering management of the cooling agent.

According to the above embodiment, the sensor-equipped RF tag 21 or the GPS receiver 34A detects the position of the taxi vehicle 7A on which the cooling box 2A is mounted. The server 5A performs the ordering in the freezing center 8A in a location based on the detection result of the sensor-equipped RF tag 21 or the GPS receiver 34A. As a result, the cooling agent can be ordered from the freezing center 8A near a location where effect of the cooling agent is expired.

According to the above embodiment, the server 5A sends the location of the freezing center 8A where the ordering is performed to the taximeter 3A and notifies the location to the taxi vehicle 7A. As a result, the taxi vehicle 7A side can know the location of the freezing center 8A where the cooling agent can be replaced.

According to the above embodiment, the server 5A calculates the maintenance time during which the temperature inside the cooling box 2A is maintained within a predetermined temperature range based on the detection result of the sensor-equipped RF tag 21, and performs the ordering based on the calculated maintenance time. As a result, the cooling agent can be replaced while the temperature inside the cooling box 2A is within the predetermined temperature range.

According to the above embodiment, the temperature inside the cooling box 2A detected by the sensor-equipped RF tag 21 is displayed on the taximeter 3A. As a result, the taxi driver and the passenger can know the temperature inside the cooling box 2A, and can manage the temperature inside the cooling box 2A.

According to the above embodiment, when the cooling box 2A is used, the taximeter 3A adds the usage fee of the cooling box 2A to a taxi fee (fare). As a result, it is possible to earn the usage fee of the cooling box 2A.

According to the above embodiment, the printing unit 36A prints a receipt describing the average temperature in the cooling box 2A. As a result, the passenger who pays the usage fee of the cooling box 2A can know the average temperature inside the used cooling box 2A.

According to the above embodiment, the box information is sent to the server 5A via the taximeter 3A, but the present invention is not limited thereto. The box information may also be sent directly from the cooling box 2A to the server 5A. Instead of the taximeter 3A, the box information may also be sent to the server 5A via a digital tachograph or other communication terminals.

According to the above embodiment, the position of the taxi vehicle 7A is detected by both the sensor-equipped RF tag 21 and the GPS receiver 34A, but the present invention is not limited thereto. It suffices if the position can be detected by either the sensor-equipped RF tag 21 or the GPS receiver 34A.

According to the above embodiment, the taxi vehicle 7A is described as an example of a commercial vehicle, but the present invention is not limited thereto. The present invention may also be applied to a commercial vehicle such as a bus.

Second Embodiment

Next, the second embodiment will be described with reference to FIGS. 6 to 9. A cooling system 1B in the second embodiment is a system in which a cooling box 2B is accommodated in a locker 7B and a shopper can use the locker 7B as a freezing locker or a refrigeration locker. The cooling system 1B in the second embodiment is also a system capable of performing ordering for replacement of a cooling agent accommodated in the cooling box 2B.

The cooling system 1B of the present embodiment includes the cooling box 2B accommodated in each of a plurality of lockers 7B, a register 3B (use request unit), a locker management unit 4B that manages the lockers 7B, a center terminal 5B installed in a freezing center 11B, and a server 6B (rental management unit) capable of communicating with the locker management unit 4B and the center terminal 5B via the Internet communication network 8B.

The locker 7B is installed in, for example, a large shopping center with a supermarket, and accommodates a purchased product purchased by a shopper 9B and temporarily deposits the purchased product. Since the cooling box 2B is the same as the cooling box 2A described in the first embodiment, detailed description thereof will be omitted here.

Figure 7:
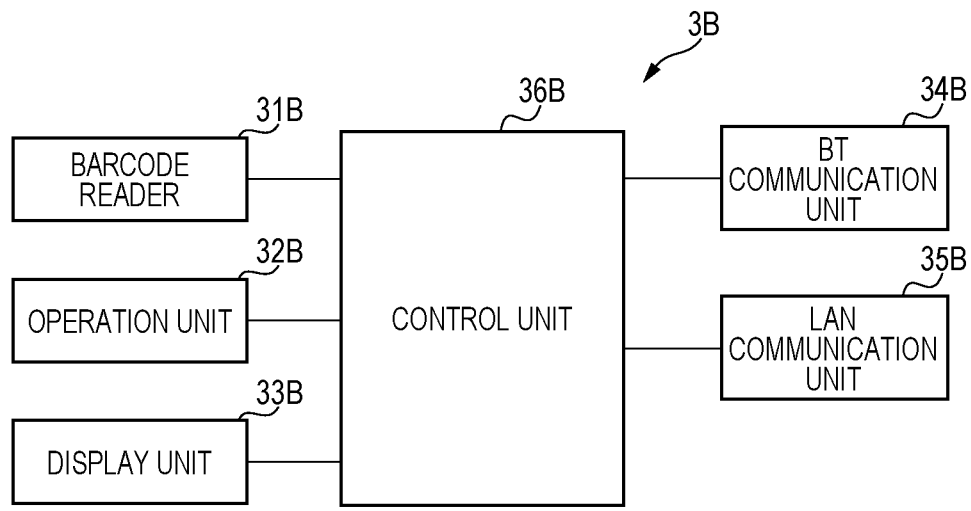
FIG. 7 is a configuration diagram of a register shown in FIG. 6.

Product information and a sales price of the purchased product is input to the register 3B, and the register 3B sums up input purchase amounts. As shown in FIG. 7, the register 3B includes a barcode reader 31B, an operation unit 32B, a display unit 33B, a BT communication unit 34B, a LAN communication unit 35B, and a control unit 36B. The barcode reader 31B reads a barcode attached to a product and inputs product information and a purchase amount. The operation unit 32B can perform various kinds of operation such as a use request for the locker 7B. The display unit 33B displays a total purchase amount and the like. The BT communication unit 34B uses, for example, the Bluetooth (registered trademark), and includes a circuit for wirelessly communicating with a mobile terminal 10B such as a smartphone owned by the shopper 9B. The LAN communication unit 35B includes a circuit for communicating with the locker management unit 4B via a LAN line or the like. The control unit 36B includes a CPU provided with a memory such as an RAM or an ROM, and controls the entire register 3B.

Figure 6:
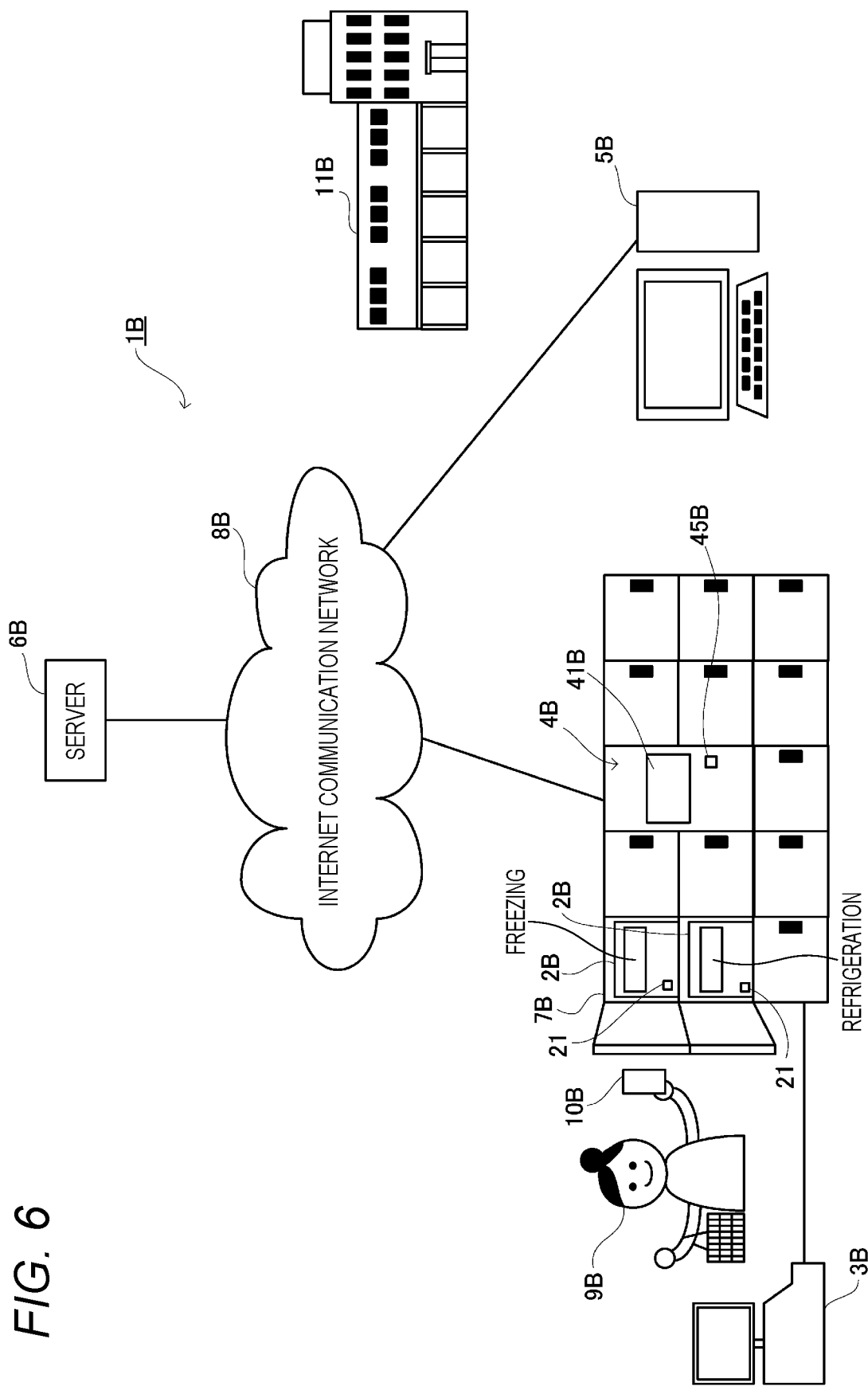
FIG. 6 is a configuration diagram of a cooling system as a cooling and warming system of the present invention in a second embodiment.
Figure 8:
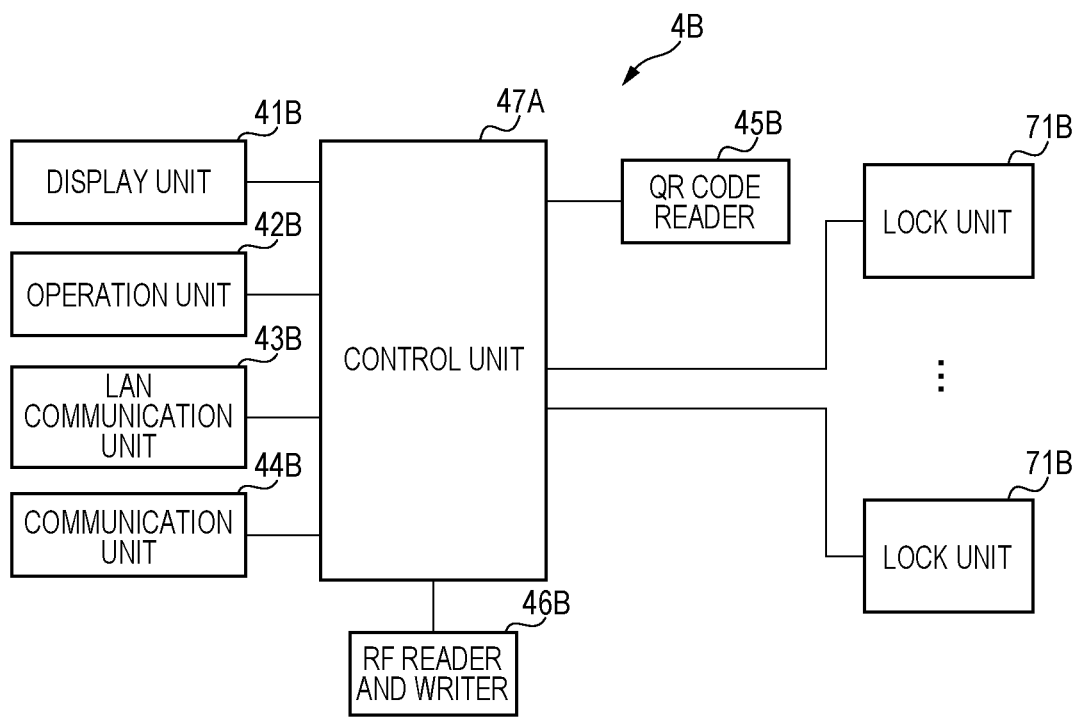
FIG. 8 is a configuration diagram of a locker management unit shown in FIG. 6.

As shown in FIG. 8, the locker management unit 4B includes a display unit 41B, an operation unit 42B, a LAN communication unit 43B, a communication unit 44B, a QR code (registered trademark) reader 45B, an RF reader and writer 46B, and a control unit 47B. As shown in FIG. 6, the display unit 41B is attached to the locker 7B, and displays guidance on a locker usage procedure to the shopper 9B who uses the locker 7B. In the present embodiment, the operation unit 42B adopts a touch panel integrated with the display unit 41B. The LAN communication unit 43B includes a circuit for communicating with the register 3B via a LAN line or the like. The communication unit 44B includes a circuit for connecting to the Internet communication network 8B.

As shown in FIGS. 6 and 8, the QR code reader 45B is attached to the display unit 41B, reads a QR code (key information) displayed on the mobile terminal 10B of the shopper 9B, and outputs the QR code (key information) to the control unit 47B. The control unit 47B includes a CPU provided with a memory such as an RAM or an ROM, and controls the entire locker management unit 4B. The control unit 47B is connected to a lock unit 71B that locks and unlocks the locker 7B, and controls the lock and unlock of the locker 7B.

Since the center terminal 5B is a terminal installed in the freezing center 11B as in the first embodiment and is the same as the center terminal 4A described in the first embodiment, detailed description thereof will be omitted here.

Since the server 6B has the same configuration as the server 5A described in the first embodiment, detailed description thereof will be omitted here.

Figure 9:
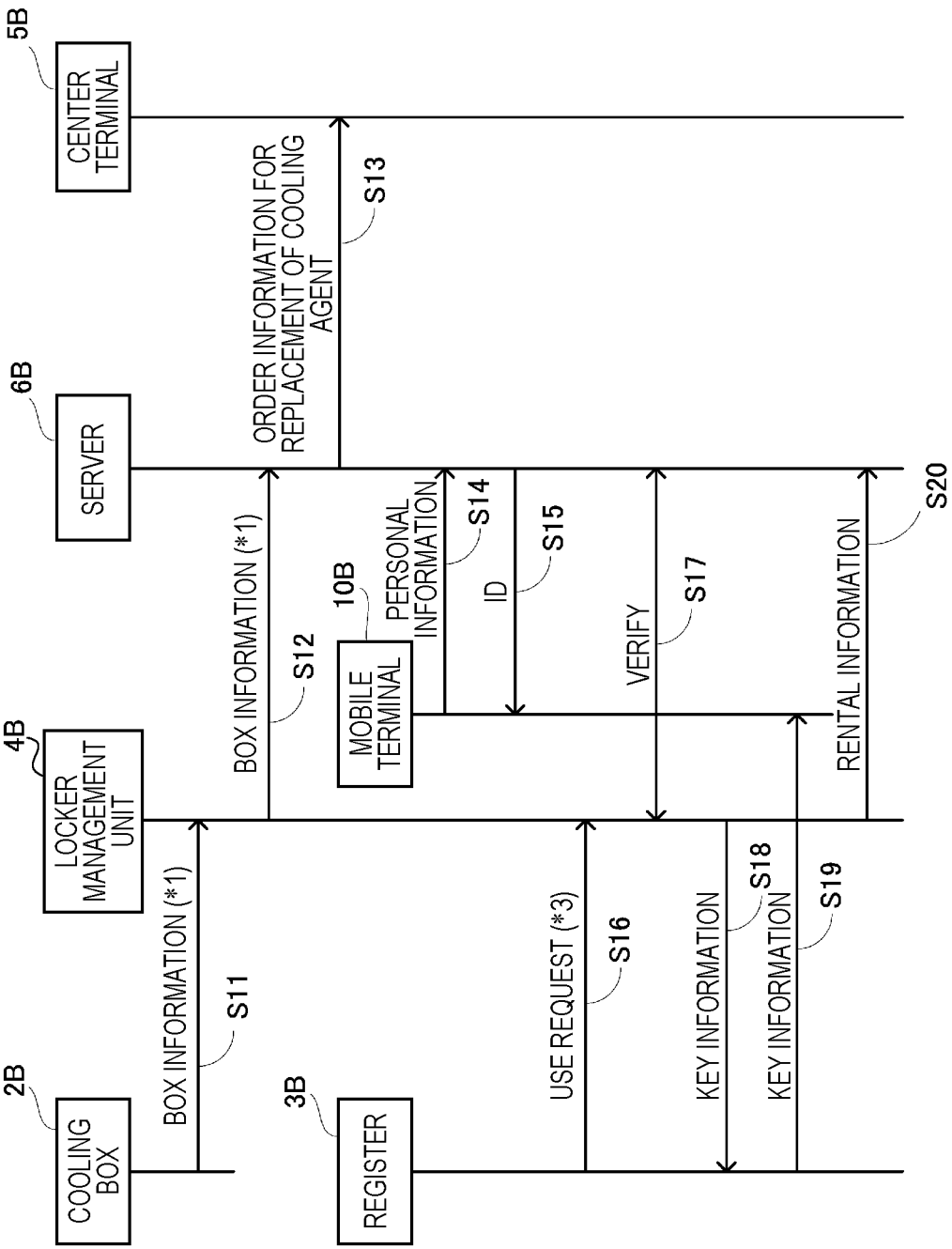
FIG. 9 is a sequence diagram showing operation of the cooling system shown in FIG. 6.

Next, operation of the cooling system 1B having the above configuration will be described with reference to FIG. 9. The box information is periodically sent from the sensor-equipped RF tag 21 provided in the cooling box 2B to the locker management unit 4B (S11). The locker management unit 4B periodically sends the box information to the server 6B (S12). The server 6B sends the order information for the replacement of the cooling agent to the center terminal 5B based on a box temperature, the temperature of the cooling agent, and the state of stock of the cooling agent in the freezing center 11B included in the box information sent from the locker management unit 4B. When receiving the order information for the replacement of the cooling agent, the center terminal 5B arranges to deliver the ordered cooling agent to a store where the locker management unit 4B is installed.

The shopper 9B operates his or her own mobile terminal 10B in advance to register use of the locker. Specifically, personal information such as a name, address, telephone number, and e-mail address of the shopper 9B is sent from the mobile terminal 10B to the server 6B (S14). The server 6B assigns an ID to each piece of personal information and sends the assigned ID to the mobile terminal 10B (S15). When receiving the ID, the immobile terminal 10B can display a barcode (or a QR code) from which the ID can be read. The shopper 9B pays for the product at the register 3B when the product is purchased. In this case, a cashier reads a barcode of the product with the barcode reader 31B of the register 3B and inputs the product information and the sales price of the purchased product. The register 3B sums up the input sales price and displays on the display unit 33B.

When reading of the barcode is completed, the cashier asks the shopper 9B whether to use the locker 7B accommodating the cooling box 2B. When using the shopper 9B, the cashier operates the operation unit 32B to perform a use request operation for the locker 7B, and asks the shopper 9B to display the barcode from which the ID can be read on the mobile terminal 10B. The shopper 9B operates the mobile terminal 10B to display the barcode from which the ID can be read on the mobile terminal 10B. The cashier reads the barcode displayed on the mobile terminal 10B with the barcode reader 31B. When the register 3B inputs the ID read by the barcode reader 31B after the use request operation is performed, the register 3B sends the use request with the ID to the locker management unit 4B (S16).

In this case, the register 3B also sends information of a temperature range (information of freezing or refrigeration) corresponding to the input product information to the locker management unit 4B. For example, the register 3B sends the information of refrigeration if the input product information is a refrigerated food, and sends the information of freezing if the input product information is a frozen food.

When receiving the use request, the locker management unit 4B sends the ID assigned to the use request to the server 6B and performs verification (S17). The server 6B verifies whether the personal information corresponding to the received ID is registered, and sends a result to the locker management unit 4B (S17). If the verification is successful, the locker management unit 4B sends the key information of the available locker 7B to the register 3B (S18). In this case, the locker management unit 4B sends the key information of the locker 7B accommodating the cooling box 2B for freezing if the use request is assigned with the information of freezing, and sends the key information of the locker 7B accommodating the cooling box 2B for refrigeration if the use request is assigned with the information of refrigeration.

When receiving the key information, the register 3B sends the key information to the mobile terminal 10B by BT communication (S19). As a result, a QR code (or a barcode) from which the key information can be read can be displayed on the mobile terminal 10B. The locker management unit 4B sends to the server 6B that the cooling box 2B accommodated in the locker 7B, which is unlocked by the sent key information, is rented. The server 6B performs rental management of the cooling box 2B based on this rental information.

When the shopper 9B operates the locker management unit 4B, the control unit 47B of the locker management unit 4B displays on the display unit 41B that "Please display the QR code on the mobile phone and have the QR code read". The shopper 9B displays the QR code on the mobile terminal 10B and holds the mobile terminal 10B up to the QR code reader 45B. The QR code reader 45B inputs the key information read from the QR code to the control unit 47B. The control unit 47B controls the lock unit 71B of the locker 7B corresponding to the key information read by the QR code reader 45B to unlock the locker 7B. When the locker 7B is unlocked by the locker management unit 4B, a door is automatically opened. When the shopper 9B accommodates the purchased product in the cooling box 2B accommodated in the locker 7B and closes the door, the locker management unit 4B locks the lock unit 71B and locks the locker 7B. In this case, the locker management unit 4B manages the locked locker 7B as being in use.

When the shopper 9B who shops at another store or finishes eating operates the locker management unit 4B again, the control unit 47B of the locker management unit 4B similarly displays on the display unit 41B that "Please display the QR code of the key information on the mobile phone and make the QR code read by the QR code reader". The shopper 9B displays the QR code on the mobile terminal 10B and have the QR code reader 45B to read the QR code. As a result, the control unit 47B controls the lock unit 71B of the locker 7B corresponding to the key information read by the QR code reader 45B to unlock the locker 7B. When the shopper 9B takes out the product from the cooling box 2B accommodated in the locker 7B and closes the door, the locker management unit 4B locks the lock unit 71B and locks the locker 7B. In this case, the shopper 9B may take out the cooling box 2B from the locker 7B and take the cooling box 2B home.

According to the above embodiment, the locker management unit 4B manages the availability of the plurality of lockers 7B accommodating the cooling box 2B. The register 3B requests use of the locker 7B with respect to the locker management unit 4B. The locker management unit 4B sends the key information for unlocking the available locker 7B to the register 3B. As a result, it is possible to manage the cooling agent accommodated in the locker 7B.

According to the above embodiment, the register 3B sends a rental request for the cooling box 2B accommodated in the locker 7B that can be unlocked by the received key information to the server 6B, and the server 6B manages the rental of the cooling box 2B based on the rental request. As a result, it is possible to manage the rental of the cooling box 2B.

According to the above embodiment, the register 3B sends the information of freezing or refrigeration corresponding to the input product information to the locker management unit 4B. As a result, it is possible to use the locker 7B set to a temperature corresponding to the product information of the purchased product.

According to the above embodiment, the key information is sent from the register 3B to the mobile terminal 10B. As a result, the locker 7B can be unlocked by the mobile terminal 10B of the shopper 9B.

According to the above embodiment, the register 3B functions as a use request unit and sends the use request for the locker 7B and the rental request for the cooling box 2B, but the present invention is not limited thereto. The mobile terminal 10B owned by the shopper 9B and the locker management unit 4B may communicate with each other via the Internet communication network 8B, and the mobile terminal 10B may also make the use request for the locker 7B and the rental request for the cooling box 2B.

According to the above embodiment, the register 3B determines whether the product is frozen or refrigerated based on the product information, but the present invention is not limited thereto. The register 3B may send the product information to the locker management unit 4B and determine whether the product is frozen or refrigerated based on the product information received by the locker management unit 4B.

According to the above embodiment, the key information is sent from the register 3B to the mobile terminal 10B, but the present invention is not limited thereto. The register 3B may print the QR code from which the key information can be read and give the QR code to the shopper 9B.

According to the above embodiment, the box information is sent to the server 6B via the locker management unit 4B, but the present invention is not limited thereto. The box information may also be sent directly from the cooling box 2B to the server 6B.

According to the above embodiment, the register 3B includes the built-in LAN communication unit 43B that communicates with the locker management unit 4B, but the present invention is not limited thereto. The LAN communication unit 43B may be externally connected to the register 3B.

Third Embodiment

Figure 10:
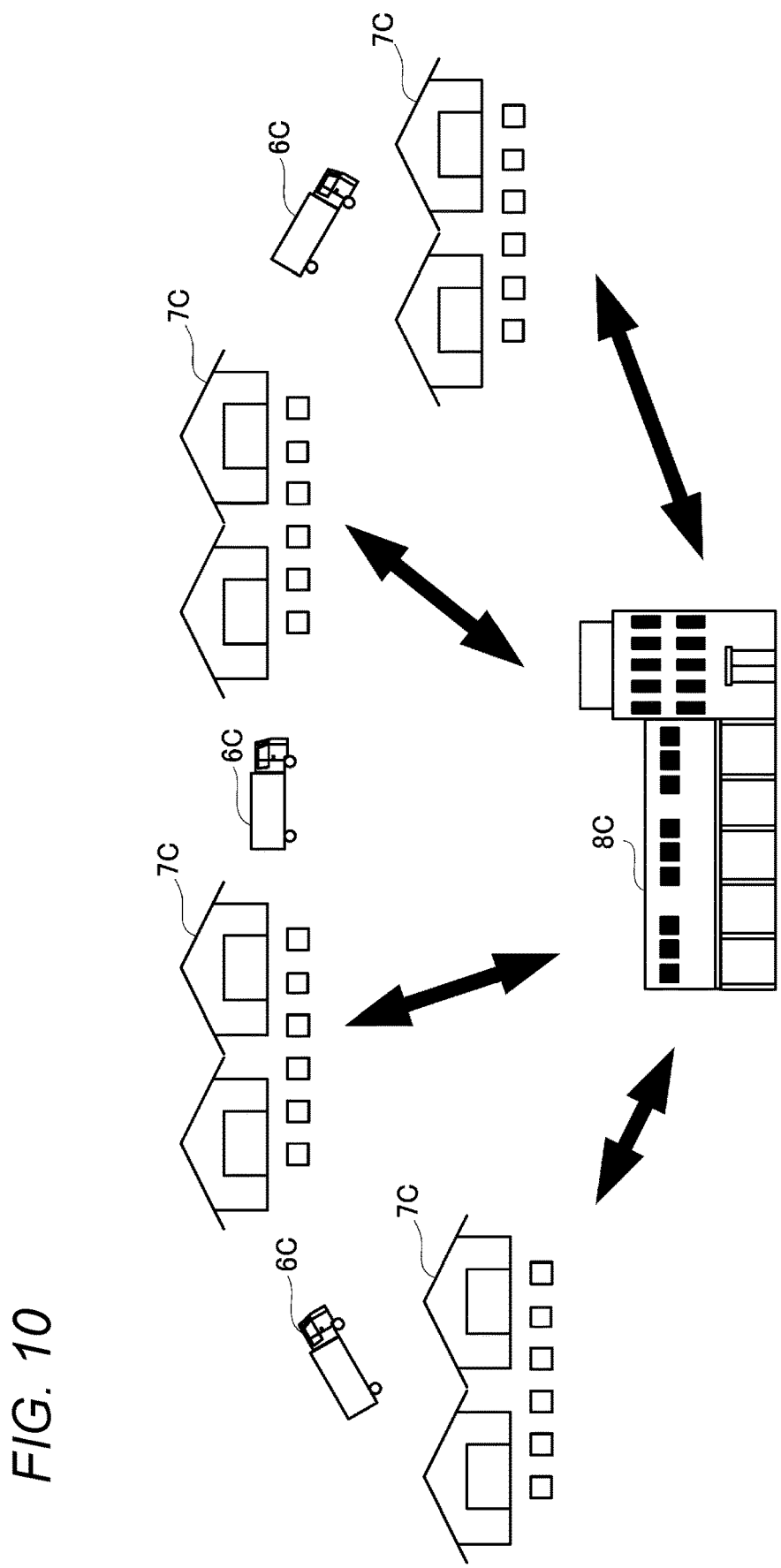
FIG. 10 is an explanatory diagram for explaining delivery of a cooling agent in a third embodiment.

Next, the third embodiment will be described with reference to FIGS. 10 to 13. As shown in FIG. 10 a cooling system 1C in the third embodiment is a system capable of delivering a cooling agent from a freezing center 8C to a transport warehouse 7C (depository) which is a base of a delivery vehicle 15C (vehicle) such as a truck.

Figure 11:
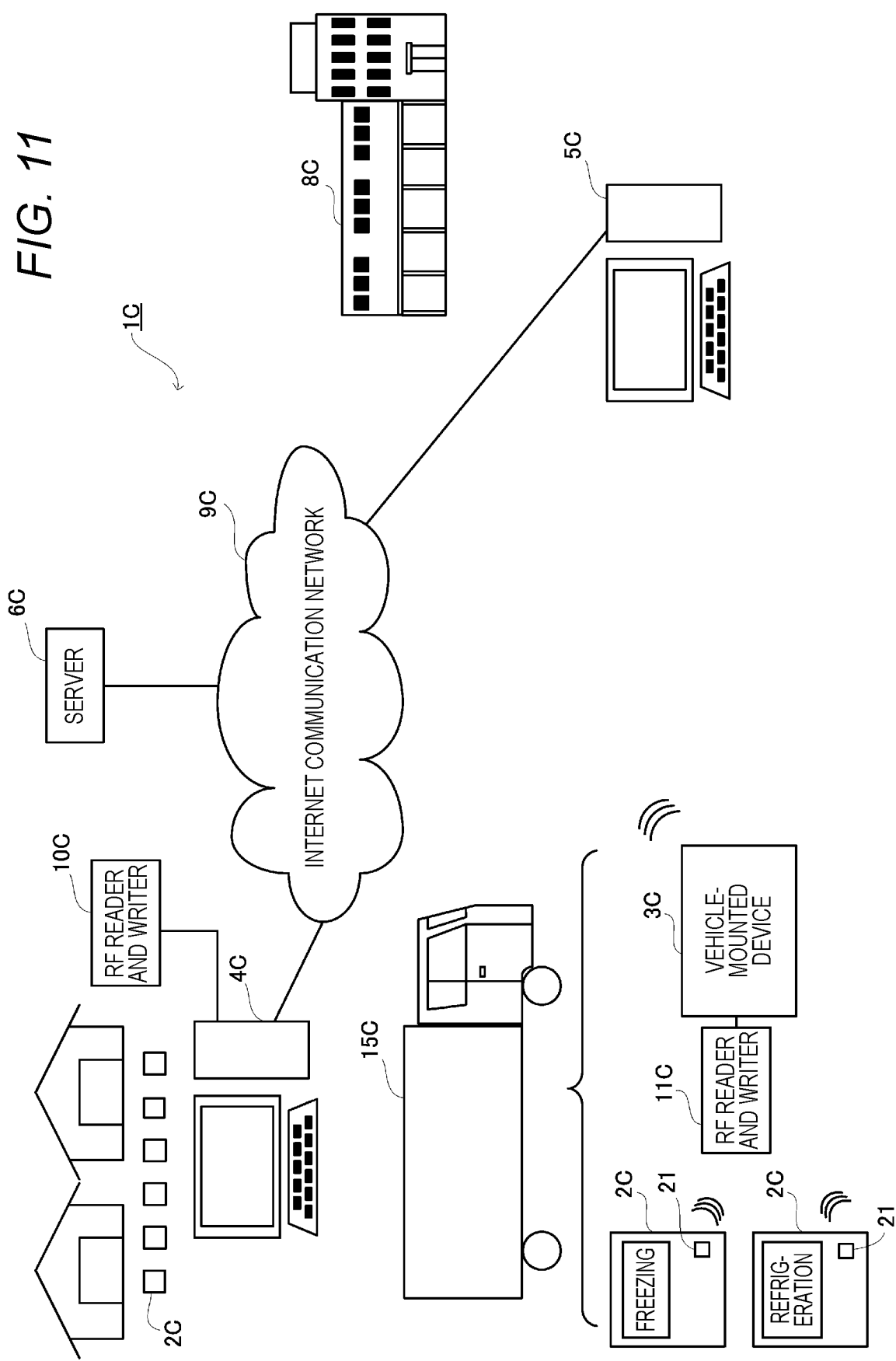
FIG. 11 is a configuration diagram of a cooling system as a cooling and warming system of the present invention in a third embodiment.

As shown in FIG. 11, the cooling system 1C includes a cooling box 2C and a vehicle-mounted device 3C mounted on the delivery vehicle 15C, a warehouse terminal 4C installed in the transport warehouse 7C, a center terminal 5C installed in the freezing center 8C, and a server 6C capable of communicating with the vehicle-mounted device 3C, the warehouse terminal 4C and the center terminal 5C via the Internet communication network 9C.

Since the cooling box 2C has the same configuration as the cooling boxes 2A and 2B described in the above first and second embodiments, detailed description thereof will be omitted here. In the present embodiment, the cooling box 2C is managed in the transport warehouse 7C and mounted on the delivery vehicle 15C. The sensor-equipped RF tag 21 attached to the cooling box 2C wirelessly communicates with an RF reader and writer 10C and an RF reader and writer 11C connected to the vehicle-mounted device 3C and the warehouse terminal 4C, which will be described later, and can read information recorded in the memory in a non-contact manner. For example, the RF reader and writer 10C and the RF reader and writer 11C read the temperature range (freezing or refrigeration), temperature inside the box, temperature of the cooling agent, humidity, position, vibration, and atmosphere composition inside the box periodically recorded in the memory of the sensor-equipped RF tag 21 as box information and outputs the box information to the vehicle-mounted device 3C and the warehouse terminal 4C.

Figure 12:
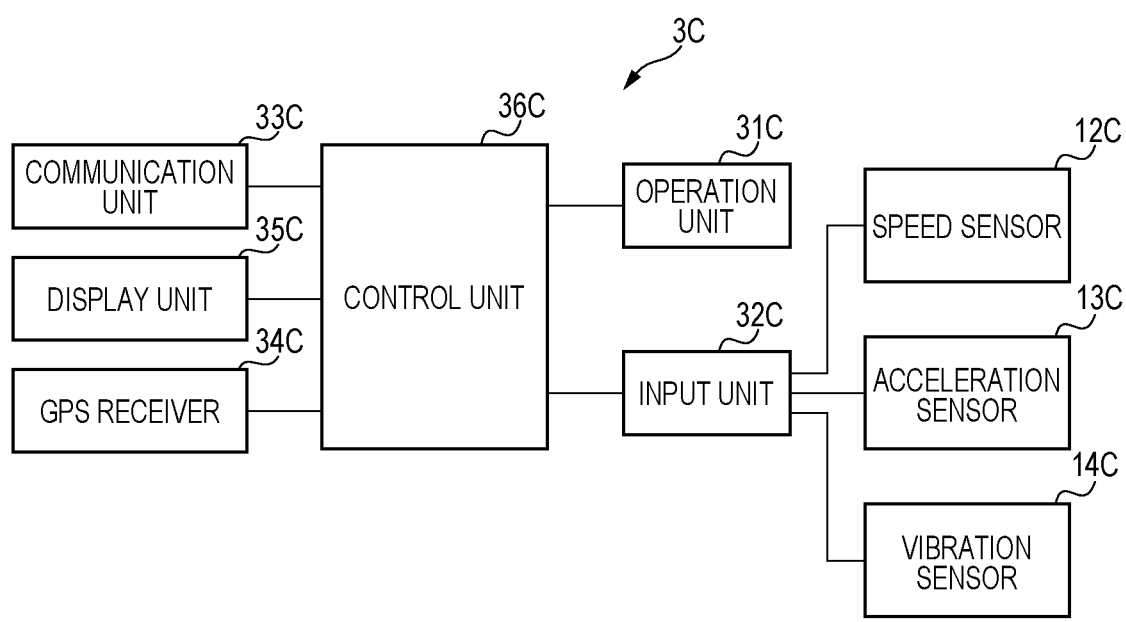
FIG. 12 is a configuration diagram of a vehicle-mounted device shown in FIG. 11.

The vehicle-mounted device 3C includes, for example, a digital tachograph mounted on the delivery vehicle 15C. The vehicle-mounted device 3C is owned by a carrier. The vehicle-mounted device 3C is mounted on the delivery vehicle 15C and collects traveling information. The vehicle-mounted device 3C sends the box information recorded in the memory of the sensor-equipped RF tag 21 read by the RF reader and writer 11C to the server 6C. As shown in FIG. 12, the vehicle-mounted device 3C includes an operation unit 31C, an input unit 32C, a communication unit 33C, a GPS receiver 34C, a display unit 35C, and a control unit 36C.

The operation unit 31C includes various buttons for operating and inputting work contents such as unloading, loading, and resting. The input unit 32C is connected to a speed sensor, an acceleration sensor, and a vibration sensor, and a speed, an acceleration, and vibration detected by the speed sensor, the acceleration sensor, and the vibration sensor are input to the input unit 32C. The communication unit 33C includes a circuit, an antenna, or the like for connecting to the Internet communication network 9C. As is well known, the GPS receiver 34C receives radio waves oscillated from a plurality of GPS satellites, acquires a current position, and outputs the current position to the control unit 36C described later.

The control unit 36C includes a CPU provided with a memory such as an RAM or an ROM, and controls the entire vehicle-mounted device 3C. The control unit 36C controls the communication unit 33C to periodically send the box information read from the sensor-equipped RF tag 21 by the RF reader and writer 11C and vehicle information to the server 6C. The vehicle information is information acquired by the vehicle-mounted device 3C, and includes, for example, the position acquired from the GPS receiver 34C, and the speed, acceleration, and vibration acquired from the speed sensor, acceleration sensor, and vibration sensor.

The warehouse terminal 4C is a terminal installed in the transport warehouse 7C and includes a PC. A small freezing facility is installed in the transport warehouse 7C, and the cooling agent is stored in the freezing facility. The transport warehouse 7C may not include the freezing facility. The RF reader and writer 10C is connected to the warehouse terminal 4C. The RF reader and writer 10C reads the information recorded in the memory of the sensor-equipped RF tag 21 provided in the cooling box 2C accommodated in the transport warehouse 7C, and outputs the information to the warehouse terminal 4C. The warehouse terminal 4C sends the box information output from the RF reader and writer 10C to the server 6C. The warehouse terminal 4C manages the stock of the frozen cooling agent and sends stock information to the server 6C.

The center terminal 5C is a terminal installed in the freezing center 8C and includes a PC. The freezing center 8C includes a large-scale freezing facility for freezing the cooling agent, and deposits the frozen cooling agent. The freezing center 8C collects the used (unfrozen) cooling agent collected from the transport warehouse 7C, freezes the cooling agent again by the freezing facility, and deposits the frozen cooling agent. The center terminal 5C communicates with the server 6C, which will be described later, to receive an order for replacement of the cooling agent.

The server 6C is owned by an operating company that operates the cooling system 1C. Since the server 6C has the same configuration as the server 5A described in the first embodiment, detailed description thereof will be omitted here.

Next, operation of the cooling system 1C having the above configuration will be described with reference to FIG. 13. The box information is sent from the sensor-equipped RF tag 21 provided in the cooling box 2C mounted on the delivery vehicle 15C to the vehicle-mounted device 3C (S31). The vehicle-mounted device 3C periodically assigns an ID of the delivery vehicle 15C to the box information and the vehicle information and sends the box information and the vehicle information to the server 6C (S32). The server 6C calculates a maintenance time during which the temperature of the cooling box 2C is maintained within the freezing temperature range or the refrigeration temperature range from the temperature of the box and the temperature of the cooling agent included in the box information. When the maintenance time is within a predetermined value, the server 6C searches the transport warehouse 7C around the current position of the delivery vehicle 15C based on the position information included in the box information and the vehicle information. The server 6C sends the order information for the replacement of the cooling agent to the warehouse terminal 4C installed in the searched transport warehouse 7C (S33). The server 6C includes the ID of the delivery vehicle 15C which performs the replacement in the order information.

When receiving the order information for the replacement of the cooling agent, the warehouse terminal 4C confirms the stock and sends a state of the stock to the server 6C. When receiving a state of in stock, the server 6C sends a reservation confirmation request to the warehouse terminal 4C. When receiving the reservation confirmation request, the warehouse terminal 4C confirms a reservation and sends that the reservation is confirmed to the server 6C. When receiving the confirmed reservation, the server 6C sends a location of the transport warehouse 7C where the ordering for the replacement of the cooling agent is performed with respect to the vehicle-mounted device 3C (S34).

The box information is sent from the sensor-equipped RF tag 21 provided in the cooling box 2C in the transport warehouse 7C to the warehouse terminal 4C. The warehouse terminal 4C periodically sends the box information to the server 6C. The warehouse terminal 4C manages the stock of the cooling agent, and sends the stock and shortage information of the cooling agent to the server 6C as warehouse information. The server 6C sends the order information for the replacement of the cooling agent to the center terminal 5B based on the warehouse information (S38). In this case, the server 6C sends the order information including a quantity of the cooling agent, a temperature range of the cooling agent, a delivery time of the cooling agent, and the location of the transport warehouse, which is a delivery destination.

When receiving the order information for the replacement of the cooling agent, the center terminal 5C confirms the stock and sends the state of the stock to the server 6C. When receiving the state of in stock, the server 6C sends the reservation confirmation request to the center terminal 5B. When receiving the reservation confirmation request, the center terminal 5C confirms a reservation and sends that the reservation is confirmed to the server 6C. Then, the server 6C performs ordering with respect to the freezing center 8C, and sends to the warehouse terminal 4C that the cooling agent is delivered and collected (S39).

According to the above embodiment, the sensor-equipped RF tag 21 detects the temperature inside the cooling box 2C and the temperature of the cooling agent, as in the first embodiment. The server 6C performs the ordering for the cooling agent based on the detection result of the sensor-equipped RF tag 21. As a result, it is possible to perform the ordering management of the cooling agent.

According to the above embodiment, since the cooling agent can be delivered from the freezing center 8C to the transport warehouse 7C, it is not necessary to equip each transport warehouse 7C with a large-scale freezing facility.

According to the above embodiment, the box information is sent to the server 6C via, the vehicle-mounted device 3C and the warehouse terminal 4C, but the present invention is not limited thereto. The box information may also be sent directly from the cooling box 2C to the server 6C.

According to the above embodiment, the server 6C sends the order information to the warehouse terminal 4C so that the replacement of the cooling agent mounted on the delivery vehicle 15C is performed in the transport warehouse 7C, but the present invention is not limited thereto. If the freezing center 8C is near the delivery vehicle 15C, the server 6C may send the order information to the center terminal 5C so that the cooling agent can be replaced at the freezing center 8C.

According to the above first to third embodiments, the cooling boxes 2A to 2C accommodating the cooling agent is used, but the present invention is not limited thereto. Instead of the cooling boxes 2A to 2C, or in addition to the cooling boxes 2A to 2C, a warming box accommodating a warming agent may be used.

According to an embodiment, a cooling and warming system (1A, 1B, 1C) includes:
 a first sensor (21) that is attached to a cooling and warming box (2A, 2B, 2C) accommodating a cooling and warming agent and that detects a temperature inside the cooling and warming box (2A, 2B, 2C) and a temperature of the cooling and warming agent; and
 an ordering unit (5A, 6B, 6C) that performs ordering of the cooling and warming agent based on a detection result of the first sensor (21).

According to the cooling and warming system having a configuration of the above, the first sensor detects the temperature inside the cooling and warming box and the temperature of the cooling and warming agent. The ordering unit performs the ordering for the cooling and warming agent based on the detection result of the first sensor. As a result, it is possible to perform ordering management of the cooling and warming agent.

The cooling and warming system (1A, 1B, 1C) may further include:
 a second sensor (21, 34A, 34C) that detects a position of a vehicle on which the cooling and warming box (2A, 2B, 2C) is mounted, in which
 the ordering unit (5A, 6B, 6C) performs the ordering at a depository (7C, 8A, 8C, 1B) for depositing the cooling and warming agent in a location based on a detection result of the second sensor (21, 34A, 34C).

According to the cooling and warming system having a configuration of the above, the second sensor detects the position of the vehicle on which the cooling and warming box is mounted. The ordering unit performs the ordering with respect to a cooling and warming center at a location based on the detection result of the second sensor. As a result, the cooling and warming agent can be ordered from the cooling and warming center near a location where effect of the cooling and warming agent is expired.

In the cooling and warming system (1A, 1B, 1C), the ordering unit (5A, 6B, 6C) may notify the vehicle of a location of the depository where the ordering is performed.

According to the cooling and warming system having a configuration of the above, the ordering unit notifies the vehicle of the location of the cooling and warming center where the ordering is performed. As a result, the vehicle side can know the location of the cooling and warming center where the cooling and warming agent can be replaced.

The cooling and warming system (1A, 1B, 1C) may further include:
- a calculation unit (5A, 6C) that calculates a maintenance time during which the temperature inside the cooling and warming box (2A, 2B, 2C) is maintained within a predetermined temperature range based on the detection result of the first sensor (21), in which
- the ordering unit (5A, 6B, 6C) performs the ordering based on the maintenance time calculated by the calculation unit (5A, 6C).

According to the cooling and warming system having a configuration of the above, the calculation unit calculates the maintenance time during which the temperature inside the cooling and warming box is maintained within a predetermined temperature range based on the detection result of the first sensor, and the ordering unit performs the ordering based on the maintenance time calculated by the calculation unit. As a result, the cooling and warming agent can be replaced while the temperature inside the cooling and warming box is within the predetermined temperature range.

The cooling and warming system (1A) may further include:
- a taximeter (3A) that calculates a taxi fee, in which
- the taximeter (3A) displays the temperature inside the cooling and warming box (2A) detected by the first sensor (21).

According to the cooling and warming system having configurations of the above, the temperature inside the cooling and warming box detected by the first sensor is displayed on the taximeter. As a result, a taxi driver and a passenger can know the temperature inside the cooling and warming box, and can manage the temperature inside the cooling and warming box.

In the cooling and warming system (1A), when the cooling and warming box (2A) is used, the taximeter (3A) may add a usage fee of the cooling and warming box (2A) to the taxi fee.

According to the cooling and warming system having a configuration of the above, when the cooling and warming box is used, the taximeter adds the usage fee of the cooling and warming box to the taxi fee. As a result, it is possible to earn the usage fee of the cooling and warming box.

In the cooling and warming system (1A), the taximeter (3A) may include a printing unit (36A) that prints a receipt indicating the taxi fee, and
when the cooling and warming box (2A) is used, the printing unit (36A) prints an average temperature inside the cooling and warming box (2A).

According to the cooling and warming system having a configuration of the above, the printing unit prints the receipt in which the average temperature inside the cooling and warming box is described. As a result, a passenger who pays the usage fee of the cooling and warming box can know the average temperature inside the used cooling and warming box.

The cooling and warming system (1B), may further include:
- a locker management unit (4B) that manages availability of a plurality of lockers (7B) accommodating the cooling and warming box (2B); and
- a use request unit (3B) that requests use of the locker (7B) with respect to the locker management unit (4B), in which
- when receiving a use request for the locker (7B) from the use request unit (3B), the locker management unit (4B) sends key information for unlocking an available locker (7B) to the use request unit (3B).

According to the cooling and warming system having configurations of the above, the locker management unit manages the availability of the plurality of lockers accommodating the cooling and warming box. The use request unit requests the use of the locker with respect to the locker management unit. The locker management unit sends the key information for unlocking the available locker to the use request unit. As a result, it is possible to manage the cooling and warming agent accommodated in the locker.

The cooling and warming system (1B, 1C) may further include:
- a rental management unit (6B) that manages rental of the cooling and warming box (2A, 2B, 2C), in which
- the use request unit (3B) sends a rental request for the cooling and warming box (2A, 2B, 2C) accommodated in the locker (7B) that can be unlocked by the received key information to the rental management unit (6B), and
- the rental management unit (6B) manages the rental of the cooling and warming box (2A, 2B, 2C) based on the rental request.

According to the cooling and warming system having a configuration of the above, the use request unit sends the rental request for the cooling and warming box accommodated in the locker that can be unlocked by the received key information to the rental management unit, and the rental management unit manages the rental of the cooling and warming box based on the rental request. As a result, it is possible to manage the rental of the cooling and warming box.

The cooling and warming system (1B) may further include:
- a register (3B) to which product information and a sales price of a purchased product is input and that sums up input purchase amounts, in which
- the locker management unit (4B) manages the availability of the lockers (7B) set to a plurality of types of temperature ranges, and
- the use request unit (3B) is built in or connected to the register (3B), and requests use of a locker (7B) set to a temperature range corresponding to the input product information.

According to the cooling and warming system having a configuration of the above, it is possible to use the locker set to the temperature corresponding to the product information of the purchased product.

The cooling and warming system (1B) may further include:
- a register (3B) to which product information and a sales price of a purchased product is input and that sums up input purchase amounts, in which
- the locker management unit (4B) manages the availability of the lockers (7B) set to a plurality of types of temperature ranges, the use request unit (3B) is built in or connected to the register (3B), and sends the input product information to the locker management unit (4B), and the locker management unit (4B) sends key information of the locker (7B) set to the temperature range corresponding to the sent product information to the use request unit (3B).

According to the cooling and warming system having a configuration of the above, it is possible to use the locker set to the temperature corresponding to the product information of the purchased product.

In the cooling and warming system (1B), when receiving the key information from the locker management unit (4B), the use request unit (3B) may send the key information to a mobile terminal (10B) of a shopper.

According to the cooling and warming system having a configuration in the above, the locker can be unlocked by the mobile terminal of the shopper.

A cooling and warming system (1A) may include:

a first sensor (21) that is attached to a cooling and warming box (2A) accommodating a cooling and warming agent and that detects a temperature inside the cooling and warming box (2A) and a temperature of the cooling and warming agent; and a taximeter (3A) that calculates a taxi fee of a taxi vehicle on which the cooling and warming box (2A) is mounted, in which the taximeter (3A) displays the temperature inside the cooling and warming box (2A) detected by the first sensor (21).

According to the cooling and warming system having configurations of the above, the temperature inside the cooling and warming box detected by the first sensor is displayed on the taximeter. As a result, a taxi driver and a passenger can know the temperature inside the cooling and warming box, and can manage the temperature inside the cooling and warming box.

A cooling and warming system (1B) may include:

a locker management unit (4B) that manages availability of a plurality of lockers (7B) accommodating a cooling and warming box (2C) in which a cooling and warming agent is accommodated; and a use request unit (3B) that requests use of the locker (7B) with respect to the locker management unit (4B), in which when receiving a use request for the locker (7B) from the use request unit (3B), the locker management unit (4B) sends key information for unlocking an available locker (7B) to the use request unit (3B).

According to the cooling and warming system having configurations of the above, the locker management unit manages the availability of the plurality of lockers accommodating the cooling and warming box. The use request unit requests the use of the locker with respect to the locker management unit. The locker management unit sends the key information for unlocking the available locker to the use request unit. As a result, it is possible to manage the cooling and warming agent accommodated in the locker.

According to an embodiment, it is possible to achieve a cooling and warming system capable of managing a cooling and warming box, such as ordering management of a cooling and warming agent.

Although the present invention is described in detail with reference to the specific embodiments, it is apparent to those skilled in the art that various changes and modifications can be made without departing from the spirit and scope of the present invention.

What is claimed is:

1. A cooling and warming system, comprising:
a first sensor that is attached to a cooling and warming box accommodating a cooling and warming agent and that detects a temperature inside the cooling and warming box and a temperature of the cooling and warming agent;
an ordering unit that performs ordering of the cooling and warming agent based on a detection result of the first sensor; and
a second sensor that detects a position of a vehicle on which the cooling and warming box is mounted, wherein
the ordering unit performs the ordering at a depository for depositing the cooling and warming agent in a location based on a detection result of the second sensor.

2. The cooling and warming system according to claim 1, wherein
the ordering unit notifies the vehicle of a location of the depository where the ordering is performed.

3. The cooling and warming system according to claim 1, further comprising:
a calculation unit that calculates a maintenance time during which the temperature inside the cooling and warming box is maintained within a predetermined temperature range based on the detection result of the first sensor, wherein
the ordering unit performs the ordering based on the maintenance time calculated by the calculation unit.

4. The cooling and warming system according to claim 1, further comprising:
a taximeter that calculates a taxi fee, wherein
the taximeter displays the temperature inside the cooling and warming box detected by the first sensor.

5. The cooling and warming system according to claim 4, wherein
when the cooling and warming box is used, the taximeter adds a usage fee of the cooling and warming box to the taxi fee.

6. The cooling and warming system according to claim 4, wherein
the taximeter includes a printing unit that prints a receipt indicating the taxi fee, and
when the cooling and warming box is used, the printing unit prints an average temperature inside the cooling and warming box.

7. The cooling and warming system according to claim 1, further comprising:
a locker management unit that manages availability of a plurality of lockers accommodating the cooling and warming box; and
a use request unit that requests use of the locker with respect to the locker management unit, wherein
when receiving a use request for the locker from the use request unit, the locker management unit sends key information fir unlocking an available locker to the use request unit.

8. The cooling and warming system according to claim 7, further comprising:
a rental management unit that manages rental of the cooling and warming box, wherein
the use request unit sends a rental request for the cooling and warming box accommodated in the locker that can be unlocked by the received key information to the rental management unit, and
the rental management unit manages the rental of the cooling and warming box based on the rental request.

9. A cooling and warming system, comprising:

a first sensor that is attached to a cooling and warming box accommodating a cooling and warming agent and that detects a temperature inside the cooling and warming box and a temperature of the cooling and warming agent; and an ordering unit that performs ordering of the cooling and warming agent based on a detection result of the first sensor, a locker management unit that manages availability of a plurality of lockers accommodating the cooling and warming box; and a use request unit that requests use of the locker with respect to the locker management unit, wherein when receiving a use request for the locker from the use request unit, the locker management unit sends key information for unlocking an available locker to the use request unit, the cooling and warming system further comprising:

a register to which product information and a sales price of a purchased product is input and that sums up input purchase amounts, wherein the locker management unit manages the availability of the lockers set to a plurality of types of temperature ranges, and the use request unit is built in or connected to the register, and requests use of a locker set to a temperature range corresponding to the input product information.

10. A cooling and warming system, comprising:

a first sensor that is attached to a cooling and warming box accommodating a cooling and warming agent and that detects a temperature inside the cooling and warming box and a temperature of the cooling and warming agent; and an ordering unit that performs ordering of the cooling and warming agent based on a detection result of the first sensor, a locker management unit that manages availability of a plurality of lockers accommodating the cooling and warming box; and a use request unit that requests use of the locker with respect to the locker management unit, wherein when receiving a use request for the locker from the use request unit, the locker management unit sends key information for unlocking an available locker to the use request unit, the cooling and warming system further comprising:

a register to which product information and a sales price of a purchased product is input and that sums up input purchase amounts, wherein the locker management unit manages the availability of the lockers set to a plurality of types of temperature ranges, the use request unit is built in or connected to the register, and sends the input product information to the locker management unit, and the locker management unit sends key information of the locker set to the temperature range corresponding to the sent product information to the use request unit.

11. The cooling and warming system according to claim 9, wherein when receiving the key information from the locker management unit, the use request unit sends the key information to a mobile terminal of a shopper.

12. The cooling and warming system according to claim 10, wherein when receiving the key information from the locker management unit, the use request unit sends the key information to a mobile terminal of a shopper.

* * * * *